United States Patent [19]

Montagu

[11] 4,185,215
[45] Jan. 22, 1980

[54] PERMANENT MAGNET SYNCHRONOUS MOTOR

[75] Inventor: Jean I. Montagu, Brookline, Mass.

[73] Assignee: General Scanning, Inc., Watertown, Mass.

[21] Appl. No.: 904,910

[22] Filed: May 11, 1978

[51] Int. Cl.² .............................................. H02K 7/10
[52] U.S. Cl. ..................................... 310/83; 310/156; 310/266
[58] Field of Search .................. 310/67, 83, 266, 156, 310/152; 335/303

[56] References Cited

U.S. PATENT DOCUMENTS

| | | | |
|---|---|---|---|
| 1,118,616 | 11/1914 | Apple | 310/83 X |
| 1,442,217 | 1/1923 | H'Doubler | 310/83 X |
| 2,316,122 | 4/1943 | Nardone | 310/83 X |
| 2,450,290 | 9/1948 | Maxwell | 310/83 |
| 3,008,061 | 11/1961 | Mims et al. | 310/83 |
| 3,146,363 | 8/1964 | Sidell et al. | 310/83 |
| 3,231,770 | 1/1966 | Hyde | 310/156 |
| 3,508,091 | 4/1970 | Kavanaugh | 310/164 X |
| 3,633,055 | 1/1972 | Maier | 310/156 |
| 3,646,375 | 2/1972 | Mader | 310/83 |
| 3,812,928 | 5/1974 | Rockwell et al. | 310/67 X |

Primary Examiner—Donovan F. Duggan

[57] ABSTRACT

A subfractional horsepower permanent magnet synchronous motor comprises an annular stator and a cup-form permanent magnet rotor defining an internal cylindrical volume. The rotor is supported for rotation within the stator about the axis of the motor and with an annular air gap between the stator and the cup-form rotor, and means including a stator coil is adapted to be energized to rotate the rotor relative to the stator. An output shaft coaxial with the rotor extends outwardly from one end of the stator, and a stationary support bushing for the output shaft extends into the internal volume defined by the rotor. A gear train is mounted in the space between the inward end of the support bushing and the closed end of the cup-form rotor, and is coupled between the rotor and the output shaft to provide a predetermined speed reduction ratio between the rotor and the output shaft. The gear train comprises at least three gear members, a first gear member cantilever mounted from the stationary support bushing, a second gear member cantilever mounted from the closed end of the cup-form rotor, and a third gear member mounted from said output shaft, one of the gear members comprising a cluster of two gears mounted in offset relation to the output shaft and the other two gear members being coaxial with the output shaft.

11 Claims, 6 Drawing Figures

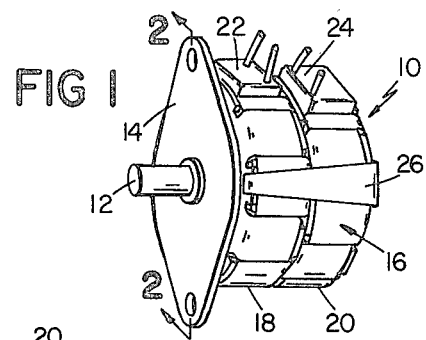
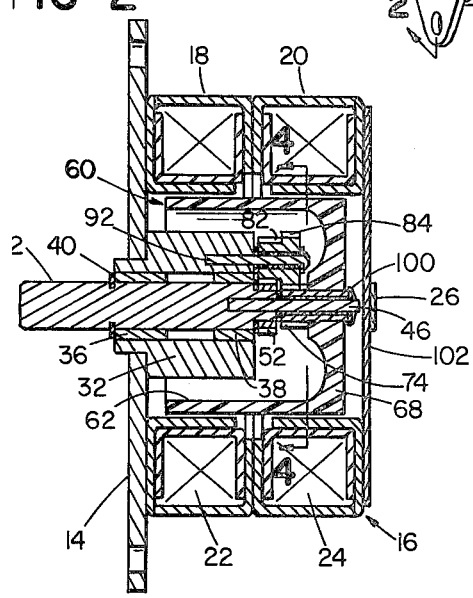
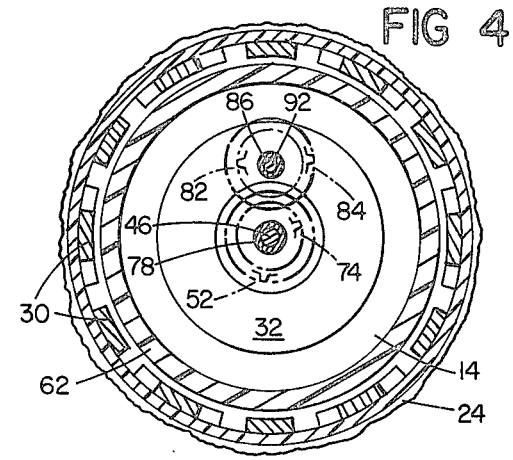
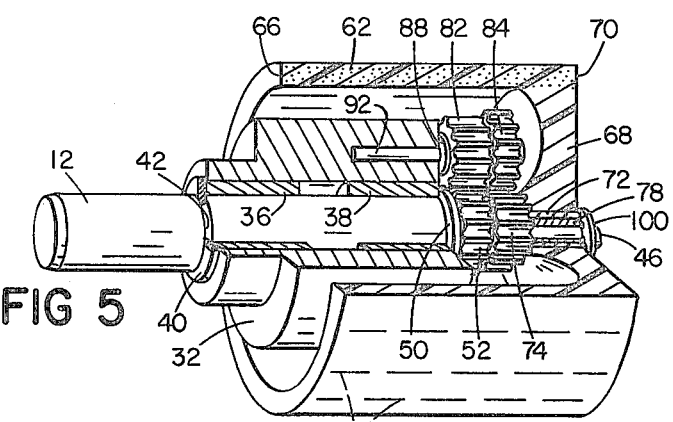
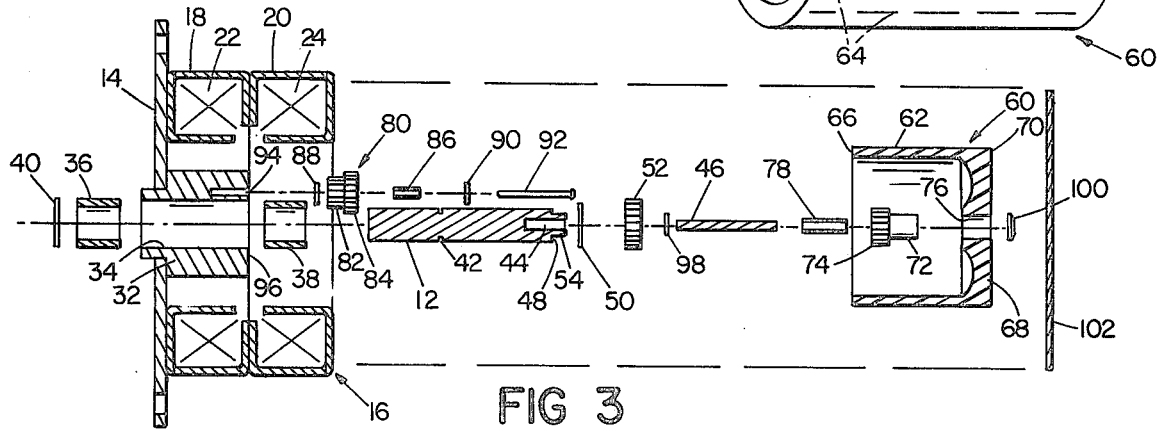
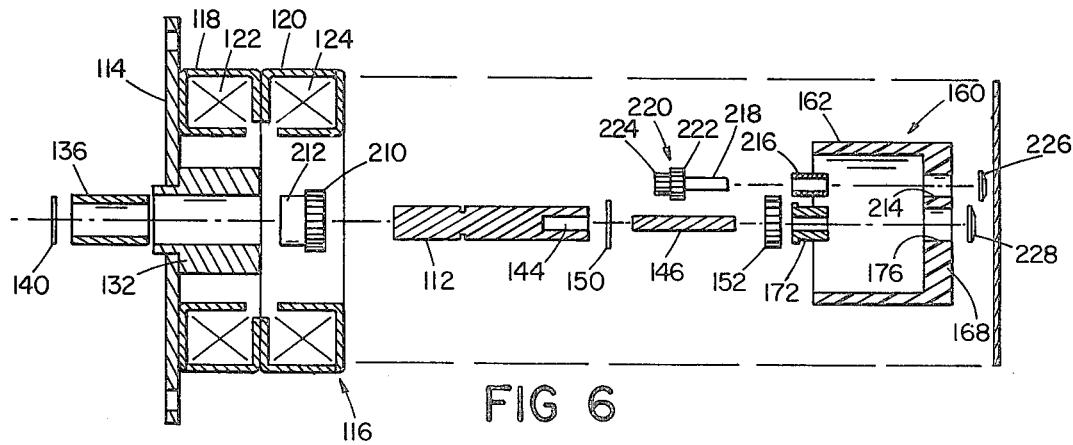

PERMANENT MAGNET SYNCHRONOUS MOTOR

This invention relates to electric motors and more particularly to small electric motors, e.g. of the subfractional horsepower type.

In many instances it is desirable that the shaft of such a motor be driven at slow speed. For this purpose, speed reducers, coupled to and driven by the output shaft of the motor, are conventionally used. Such speed reducers, however, are relatively bulky and weighty, and thus are not appropriate for installations where small size and light weight are important. Motor arrangements have also been proposed with speed reduction mechanisms within the motor housings, but such arrangements typically have been unsuited for subfractional horsepower motors due to their complexity. A type of small motor is a permanent magnet synchronous motor which has numerous computer peripheral, business machine and instrumentation applications where both size and weight are important considerations. The inertia of such motors must be low as their rotors must be immediately accelerated into synchronism with the energizing signal and the speed reduction mechanism must not unduly load the rotor of such a motor.

It is an object of this invention to provide novel and improved small motors whose output shafts are driven at slow speeds.

In accordance with the invention there is provided a subfractional horsepower permanent magnet synchronous motor comprising an annular stator and a cup-form permanent magnet rotor defining an internal cylindrical volume. The rotor is supported for rotation within the stator about the axis of the motor and with an annular air gap between the stator and the cup-form rotor, and means including a stator coil is adapted to be energized to rotate the rotor relative to the stator. An output shaft coaxial with the rotor extends outwardly from one end of the stator, and a stationary support bushing for the output shaft extends into the internal volume defined by the rotor. A gear train is mounted in the space between the inward end of the support bushing and the closed end of the cup-form rotor, and is coupled between the rotor and the output shaft to provide a predetermined speed reduction ratio between the rotor and the output shaft. The gear train comprises at least three gear members, a first gear member cantilever mounted from the stationary support bushing, a second gear member cantilever mounted from the closed end of the cup-form rotor, and a third gear member mounted from said output shaft, one of the gear members comprising a cluster of two gears mounted in offset relation to the output shaft and the other two gear members being coaxial with the output shaft.

In particular embodiments, the cup-form rotor defines a cylindrical volume of about one inch internal diameter. The sleeve portion of the cup-form rotor comprises a plastic matrix containing a multiplicity of magnetic particles that are magnetized to define a series of axially extending rotor poles about its periphery. The moment of inertia of the rotor is less than 15 g cm$^2$ and the rotor sleeve has a radial thickness of less than four millimeters. A cantilever output shaft support bushing is secured to the stator and over half of the portion of the shaft actually engaged by the shaft support is within the rotor. In a preferred embodiment, a first gear is secured to the rotor, a second gear is secured to the output shaft and the cluster gear is secured to the stator, while in another embodiment a first gear is secured to the output shaft, a second gear is secured to the stator and the cluster gear is secured to the rotor.

These motor constructions provide slow output shaft speeds in compact motor housing configurations. The gear train arrangements are reliable in operation and the motor and gear trains are simple and economical to manufacture. Other features and advantages of the invention will be seen as the following description of particular embodiments progresses, in conjunction with the drawings, in which:

FIG. 1 is a perspective view of a subfractional reversible synchronous motor in accordance with the invention;

FIG. 2 is a sectional view taken along the line 2—2 of FIG. 1;

FIG. 3 is an exploded view of the motor shown in FIGS. 1 and 2;

FIG. 4 is a sectional view taken along the line 4—4 of FIG. 2;

FIG. 5 is a perspective view, with parts broken away, of the rotor and output shaft of the motor shown in FIGS. 1-4; and FIG. 6 is an exploded view of another embodiment of a subfractional reversible synchronous motor.

DESCRIPTION OF PARTICULAR EMBODIMENTS

Shown in FIG. 1 is a reversible, permanent magnet synchronous motor 10 that has a diameter of about 2.3 inch and a length of about 1.4 inch. Output shaft 12 has a diameter of about 0.25 inch and extends about 0.7 inch from base plate 14. Annular stator 16 includes two sections 18, 20, each of which has an associated coil 22, 24. Stator sections 18, 20 are secured together with spring clip 26. The speed of output shaft 12 is a function of a gear train housed within the motor and in this embodiment, shaft speeds in the range of 10–300 rpm are available through selection of components of the gear train.

Further details of the construction of motor 10 may be seen with reference to the sectional view of FIG. 2 and the exploded view of FIG. 3. Stator 16 is of the type shown in my copending application Ser. No. 826,477 filed Aug. 22, 1977, now abandoned, entitled "ELECTRIC MOTOR CONSTRUCTIONS" assigned to the same assignee as this application. The disclosure of that application is incorporated herein by reference. Each stator section 18, 20 has a series of twelve stator poles 30 (FIG. 4) spaced about its periphery, the array of poles 30 of stator section 18 being angularly offset (by fifteen degrees) from the array of stator poles 30 of section 20. Base plate 14 is secured to stator section 18 and shaft support bushing 32 is secured to base plate 14. Aluminum bushing 32 has a diameter of about 0.7 inch, a length of about 0.8 inch and an axial bore of about 0.3 inch diameter. Output shaft 12 is cantilever supported in bushing 32 by two oilite sleeve bearings 36, 38 and is secured by retainer 40 which seats in shaft groove 42.

At the inner end of shaft 12 is bore 44 into which shaft extension 46 (about 0.1 inch in diameter) is pressed so that it rotates as a unit with output shaft 12. Shoulder 48 at the inner end of shaft 12 receives compression washer 50 and output gear 52 is pressed onto the reduced diameter 54 of shaft 12 so that it is cantilever supported and rotates as a unit with that shaft.

Cup-form permanent magnet rotor 60 is disposed within stator 16 and is cantilever supported to provide an annular air gap of about 0.015 inch radial width between rotor 60 and stator poles 30. Cup-form rotor 60 has a moment of inertia of about ten g cm$^2$ and includes a thin walled cylindrical sleeve 62 about one inch in length, about 1.2 inch in outer diameter and with a wall thickness of about 0.1 inch. Sleeve 62 consists of permanent magnet particles (e.g. barium ferrite, samarium cobalt, or Alnico 8) rigidly supported in bonding material. In a preferred embodiment, rotor sleeve 62 is a molded composition of about eighty-five percent barium ferrite particles (up to about twenty microns in size) and about fifteen percent nylon. Twenty-four axially extending rotor poles 64 (FIG. 5) (twelve pole pairs) extend about the periphery of rotor sleeve 62. One end 66 of sleeve 62 is open and support disc 68 is at the closed end 70 of cup-form rotor 60. Stub shaft 72 of rotor pinion gear 74 is pressed into bore 76 of support disc 68 and sleeve bearing 78 is pressed into the coaxial bore of rotor pinion 74.

Compound gear cluster 80 includes reducing gear components 82 and 84. Bearing 86 is pressed into cluster 80 and that cluster is assembled with brass spacer washers 88, 90 on axle 92 and that axle is pressed into bore 94 in support bushing 32 and provides cantilever support for cluster 80.

In assembling motor 10, the output shaft subassembly with output gear 52 and shaft extension 46 is inserted in journal bearings 36, 38 and secured with retainer 40 so that output gear 52 is immediately adjacent end surface 96 of bushing 32. The subassembly of cluster gear 80 and its axle 92 is then mounted with axle 92 being pressed into bore 94 so that gear 82 meshes with output gear 52. Brass spacer washer 98 is then mounted on shaft extension 46 and the rotor subassembly is mounted on shaft extension 46 so that the rotor 60 is supported for rotation by bearing 78 and rotor gear 74 meshes with cluster gear 84. Retainer 100 engages the end of shaft 46 to secure the rotor on the output shaft subassembly and end plate 102 is seated on the outer stator section 20 and secured in position by spring clip 26.

Relationships between the gear components of the compound gear train, the rotor 60 and the output shaft 12 are shown in FIGS. 4 and 5. Rotor 60 is driven in rotation by signals applied to stator coils 22, 24. Rotor gear 74 drives gear component 84 of cluster 80 and gear component 82 in turn drives output gear 52 so that output shaft 12 rotates at a slower speed than rotor 60. This rotational speed of output shaft 12 is a function of the components of the gear train and, as indicated above, shaft speeds in the range of 10–300 rpm are available in this motor configuration, the rotor speed being 300 rpm when the motor is energized with 60 HZ power. The gear train is housed within a space of less than 0.3 inch axial length (between bushing end surface 96 and the adjacent opposed surface of rotor support 68). If a multistage gear train is used, the length of shaft support bushing 32 may be reduced to accommodate the additional gear stages. In such arrangement a journal bearing may be provided on cover 102 for supporting shaft extension 46. In an alternative embodiment, shaft extension 46 is integral with rotor 60 and a bearing at the end of shaft 12 accommodates the different rotational speeds of shaft 12 and shaft extension 46.

Another permanent magnet synchronous motor embodiment is shown in the exploded view of FIG. 6. That embodiment includes a similar stator 116 having stator sections 118, 120 and base plate 114. Fixed coaxial gear 210 has extension 212 press fitted into shaft support bushing 132 and, in cooperation with sleeve bearing 136, provides bearing support for output shaft 112. Output gear 152 is pressed on extension 146 of output shaft 112. Low inertia permanent magnet rotor 160 similarly includes thin wall sleeve 162 with axially extending rotor poles. Sleeve support disc 168 has coaxial bore 176 which receives flanged bearing bushing 172. A second bore 214 in rotor support disc 168 (eccentric of bore 176) receives sleeve bearing 216 which in turn receives shaft 218 of cluster gear 220 that has gear components 222 and 224. Cluster 220 is secured to rotor 160 by retainer 226; and the rotor subassembly is secured on shaft extension 146 by retainer 228 with cluster gear 222 meshing with output shaft 152 and cluster gear 224 meshing with fixed gear 210. In operation, cluster 220 as driven by rotor 160, drives output shaft 112 at a slower speed than rotor 160.

The compact coaxial gear train arrangements housed within the low inertia rotor enable slow output shaft speeds in permanent magnet synchronous motors of small size, without sacrificing rotor alignment and shaft stability and without increase in the overall motor housing dimensions. Other embodiments will be apparent to those skilled in the art.

What is claimed is:

1. A subfractional horsepower permanent magnet synchronous motor comprising
    an annular stator, a cup-form permanent magnet rotor defining an internal cylindrical volume, said rotor being supported for rotation within said stator about the axis of said motor and with an annular air gap between said stator and said cup-form rotor, means including a stator coil adapted to be energized to rotate said rotor relative to said stator,
    an output shaft coaxial with said rotor and extending outwardly from one end of said stator,
    a stationary support bushing for said output shaft extending into said internal volume defined by said rotor,
    and a gear train mounted in the space between the inward end of said support bushing and the closed end of said cup-form rotor, and coupled between said rotor and said output shaft to provide a predetermined speed reduction ratio between said rotor and said output shaft,
    said gear train comprising at least three gear members, at least a first gear member cantilever mounted from said stationary support bushing, a second gear member cantilever mounted from said closed end of said cup-form rotor, and a third gear member mounted from said output shaft, one of said gear members comprising a cluster of two gears mounted in offset relation to said output shaft and the other two gear members being coaxial with said output shaft.

2. The motor of claim 1 wherein the volume of said cup-form rotor has an internal diameter of about one inch.

3. The motor of claim 1 wherein said stationary support bushing supports said output shaft a distance of at least about one half the axial length of said cup-form rotor.

4. The motor of claim 1 wherein said rotor comprises a multiplicity of magnetic particles bonded in a plastic matrix and magnetized to define a series of axially extending rotor poles about its periphery.

5. The motor of claim 1 wherein said output shaft includes a shaft extension coaxial with, of smaller diameter than, and at one end of said output shaft, said shaft extension supporting said cup-form rotor.

6. The motor of claim 5 wherein said shaft extension is fixed to said output shaft.

7. The motor of any preceding claim wherein said cluster gear is secured to said stator.

8. The motor of any one of claims 1-6 wherein said cluster gear is secured to said rotor.

9. The motor of any one of claims 1-6 wherein the moment of inertia of said rotor is less than fifteen g cm$^2$.

10. The motor of any one of claims 1-6 wherein the radial thickness of the sleeve of said cup-form rotor is less than four millimeters.

11. The motor of any one of claims 1-6 wherein said output shaft cantilever supports said rotor.

* * * * *